Figure 3:
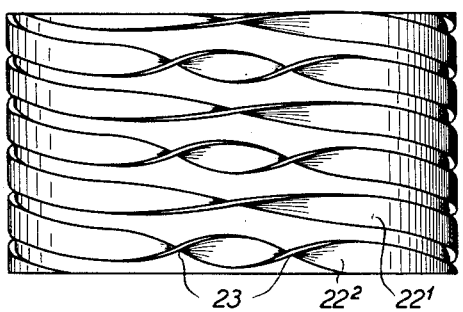

Nov. 28, 1950  J. S. MOLLERHOJ ET AL  2,531,917
EXPANSIBLE SHEATH ELECTRIC POWER CABLE
Filed Nov. 21, 1946  2 Sheets-Sheet 1
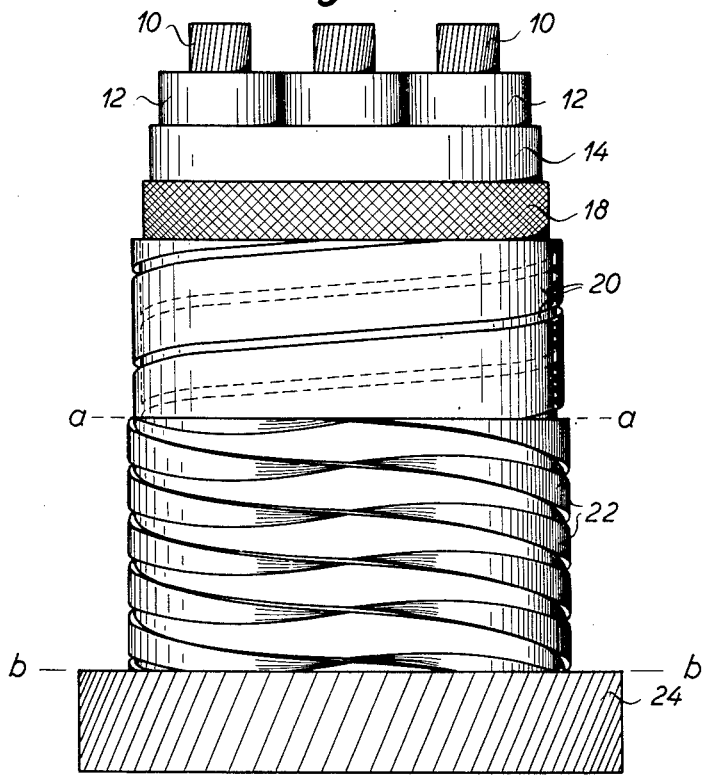
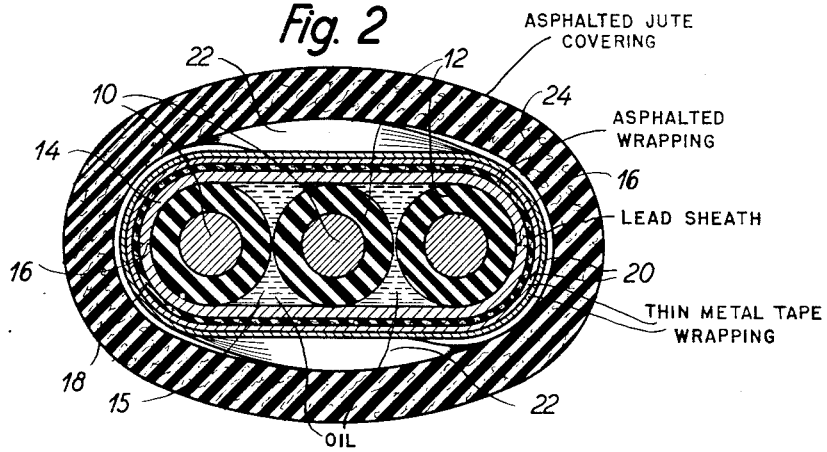
Inventors.
Johannes Sorensen Mollerhoj
Svend Stigsgaard
By Fraser, Myers & Manley
Attorneys.

UNITED STATES PATENT OFFICE 2,531,917

EXPANSIBLE SHEATH ELECTRIC POWER CABLE

Johannes Sørensen Møllerhøj, Charlottenlund, and Svend Stigsgaard, Copenhagen, Denmark Application November 21, 1946, Serial No. 711,426
In Denmark October 17, 1945

Section 1, Public Law 690, August 8, 1946
Patent expires October 17, 1965

16 Claims. (Cl. 174—13)

The present invention relates to an electric power cable with a sheath consisting of lead or another tight material and the cross-section of which is composed of strongly curved parts and less curved or flat parts lying between the strongly curved parts, thereby providing diaphragm surfaces which are externally supported by a resilient binding or winding so that they may yield elastically according to differences in pressure at the inner side of the cable. Thereby it is made possible that a cable impregnated or filled with oil may be adapted to elastically suit the volume alterations of the oil at shifting temperature so as to avoid, for instance, the appearance of hollow spaces within the cable at decreasing temperature, whereas also a certain desired superatmospheric oil pressure may be maintained during all operating conditions.

An embodiment of such a cable is known, in which the flat parts of the sheath are provided with a transversely stiffening, longitudinally flexible supporting member formed by a metallic tape arranged lengthwise of the cable and maintained in position by the outer winding. The said metallic tape extends transversely over the diaphragm surfaces so that its edges become clamped between the sheath and the winding when applying the latter to the cable. If a small element cut out transversely to the cable is considered, the metallic tape may, therefore, be regarded as a beam supported at its ends and being influenced on the inside through the sheath by the pressure prevailing within the cable. In accordance therewith it has been attempted to stiffen the tape in the transverse direction by making it corrugated. In the case of a flat cable a good flexibility is obtained in the plane containing the short axis of the cable cross-section.

The transversely stiffening metallic tape has been used, as hitherto the opinion has been, that the winding alone would not be able to support the diaphragm surfaces. When the winding member is bent round the strongly curved parts of the sheath during the winding operation bending tensions will occur in the material so that the winding member at the diaphragm surfaces will tend to form a detached arch. When applying the winding without the transversely stiffening metallic tape lying beneath and then subjecting the cable to an inner superatmospheric pressure the sheath will consequently yield until it reaches the winding whereafter the inner pressure will be received by tensions in the winding material. When as hitherto using a relatively hard and rigid winding material, such as bronze wire, the detached arch of the wire and consequently the arched sheath will get a rather large camber so that the oil volume of the cable, even at the lowest superatmospheric oil pressure used during the operation and the lowest temperature, has been materially increased compared with the known embodiment with transversely stiffening metallic tapes. This is unfortunate, however, as the smallest possible oil volume and the smallest possible volume variations at varying temperature are desired. If on the other hand a winding material is used with a small rigidity in order to decrease the camber of arch the inner pressure during the deflection of the diaphragm surfaces could only be received by subjecting the winding material to large tension stresses involving a strongly inwardly directed pressure at the strongly curved parts of the sheath, the said pressure giving rise to an undesired stress on the insulating material of the cable.

Omission of the metallic tape would, however, be appropriate in certain cases, for instance to simplify the manufacture, and the object of the invention is to obtain this by means of particular measurements. The present invention is characterized by the fact that the winding comprises at least one winding member having varying rigidity along the circumference of the sheath the rigidity being largest at the diaphragm surfaces. At the strongly curved parts of the sheath where, consequently, the rigidity will be smaller it may have such a small value that the winding member yields easily at these points during the winding operation so that no material bending stresses occur preventing the winding member from bearing against the diaphragm surfaces whereas at the same time it is obtained that the winding member tightly contacts the cable sheath at the strongly curved parts in order to obtain as well as possible an immovable clamping of the sheath at the centre of the strongly curved parts where the seam or seams of the sheath are arranged to be saved as far as possible when the cable cross-section is deformed.

The varying rigidity may be provided by increasing the rigidity of a material in question at some places and decreasing it at intermediate places or by using one of these measurements alone. Moreover, it is of no importance whether the varying rigidity is imparted to the material during or immediately prior to its being wrapped round the cable or whether the said rigidity is provided before starting the wrapping operation.

The varying rigidity may be imparted to the winding material by means of local heat treatment or mechanical treatment.

It is preferred that the winding, which may consist of a plurality of wires or tapes, comprises at least two winding members lying above each other or side by side. When to this end two identical parallel winding members are used the purpose of the said arrangement may solely be that the one member shall partly be able to be a substitute for the other one if the latter should be damaged during the operation. Both winding members may also be of different structure, however, for instance in such a manner that they support the diaphragm surfaces of the cable sheath at different points as will be further mentioned later on. If the winding members lie above each other one of them may consist of a material possessing a small rigidity throughout and simply serving as underlayer for the other member which then substantially solely serves as elastic support of the diaphragm surfaces. The winding members may also be arranged so as to lie side by side at the strongly curved parts of the sheath while they are lying above each other at the diaphragm surfaces. The last mentioned arrangement may for instance be obtained by applying the wires of the winding in opposite winding direction or by twining them about each other when applying them to the cable.

The winding preferably comprises at least two winding members with opposite winding direction whereby it may be avoided that the cable tends to twist about its own axis when the pressure varies.

The varying rigidity of the winding member may not only be obtained by means of varying properties of the material, but also by means of varying geometrical form of the profile of the winding member along the circumference of the sheath. In this embodiment even larger possibility of a pronounced variation of the rigidity is present. A varying profile may be provided either with varying cross-section or with constant cross-section. In the last mentioned case the position of the cross-section in relation to the underlayer must vary.

If the varying profile is to be obtained with constant cross-section of the winding member a cross-section is used having different resisting moment in two directions perpendicular to each other and during the winding operation the member is wrung and twined about its own axis so that the highest profile will face the diaphragm surfaces.

Figure 4:
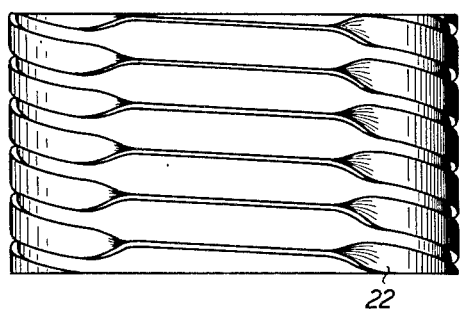
Figure 5:
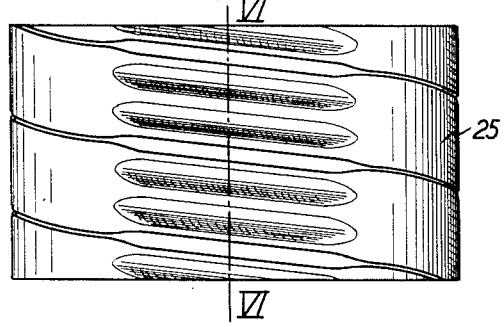
Figure 6:
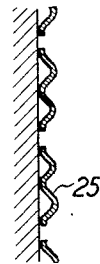

Some embodiments of an electric power cable according to the invention are described in the following with reference to the drawings in which:

Figure 1 is a side elevation of a cable, the various wrappings and windings being gradually removed from below and upwards, Figure 2 is a cross-section of the same cable, Figures 3, 4, 5, 7 and 8 are altered embodiments of the winding supporting the diaphragm surfaces of the cable sheath, each of said figures showing that part of the cable, which in Figure 1 is found between the lines a—a and b—b, and Figure 6 is a longitudinal section on the line VI—VI in Figure 5 through the winding shown in that figure.

The cable shown in Figures 1 and 2 is provided with three conductors 10 the axes of which lie in the same plane, and each conductor is surrounded by an insulation 12. Around the conductor insulation there is pressed a lead sheath 14 extending straightly at the top and the bottom from conductor to conductor, see Figure 2, forming the diaphragm surfaces of the cable and laterally following the curved surface of the insulation of the outermost conductors. The hollow space within the cable is filled with oil 15. At the centre of the curved surfaces the seams 16 of the lead sheath are found. Alternately the lead sheath may have a single seam at one side, only. On the outside the lead sheath 14 may be asphalted and covered by an asphalted paper or linen wrapping 18. On this wrapping there are wound two thin metal tapes 20 helically (one above the other) with a small distance between the turns and in such a manner that the interval between the turns of the inner tape is covered by the outer tape, the sheath 14 being thereby completely covered and only getting a limited possibility of creeping. As these tapes may slide on each other they will not prevent bending of the cable to some reasonable extent.

The tapes 20 may consist of bronze or steel having the same rigidity throughout its length. Alternately the rigidity may vary longitudinally in such a manner that it is largest opposite to the diaphragm surfaces and smallest at the curved sides of the cable. This varying rigidity may be imparted to the material by local heat treatment or mechanical treatment. Thus in the case of steel the material may be tampered by heating and quenching at the diaphragm surfaces and annealed at the strongly curved parts. An increased rigidity may also be obtained by drawing or rolling the material in cold condition.

By such varying rigidity an effective stiffening of the diaphragm surfaces of the lead sheath is obtained.

On the tapes 20 there is arranged a winding with opposite winding direction said winding consisting of flat wires 22 which are shown applied double and in such a manner that each flat wire is twined half a revolution about its own axis when running over a diaphragm surface. The twists at the upper side and the under-side may run in the same direction, but they can also run in opposite directions. At the strongly curved sides of the cable the wires 22 thus applied will lie with the flat surface against the cable, while they will bear against the cable with one edge at the upper side and the under-side, most pronounced at the centre of the diaphragm surfaces.

As shown in Figure 2 the wires 22 at the strongly curved sides of the cable have a low profile while, at the diaphragm surfaces lying above and below, they will have a profile height increasing towards the centre until the height becomes equal to the width of the wire cross-section. In accordance therewith the wires 22 will from both sides get increasing resisting moment from the edges of the diaphragm surfaces towards the centre line of the said surfaces. During the winding of the wires 22 one lateral edge of the cross-section is compelled to follow the plane diaphragm surfaces since unrestrained this edge would have formed an inwardly convex arch. Thus the centre line of the cross-section is pressed outwardly so that the innermost edges of the wires will exert a certain pressure against the diaphragm surfaces. Therefore, an initial tension to counteract the deflection of the cable sheath is present already at the lowest inner superatmospheric pressure within the cable occurring during the operation.

Instead of twining both wires 22 half a revolution over each diaphragm surface as shown in Figure 1, one wire 22¹ may be twined one half revolution, while the other wire 22² is twined a whole revolution so that this latter wire will support the sheath at two points 23 each laterally offset to the centre line of the diaphragm surface in question, see Figure 3. Hereby a more distributed support of the whole diaphragm surface may be obtained. Also other modifications are possible in that a winding member generally may be wrung or twined one or more half revolutions about its own axis for each diaphragm surface whereas it must be preferred that the winding member has no material torsion or twist opposite the strongly curved parts of the cable sheath where the largest possible bearing surface against the sheath is usually desired. Instead of two wires as shown and being wrapped double side by side a plurality of wires side by side or above each other and twined one or more or, generally, a different number of half revolutions, respectively, for each diaphragm surface, may be used.

The torsion or twining of the wires 22 is for instance effected in that way that the supply coil from which each wire is unrolled during the winding of the wire about the cable and which is guided in a path round the cable, also rotates about its own axis, i. e. that the coil must carry out a planetary movement. During this movement the local rotation of the coil may take place at constant speed or at varying speed. Another possibility is that the wire between the supply coil and the place where the wire meets the cable passes a guiding member which turns to and fro thereby imparting a corresponding torsion to the wire.

The wires 22 may be produced from bronze, stainless or galvanized steel or the like suitable material.

The embodiment shown in Figure 4 differs from that shown in Figure 1 therein that the flat wires 22 are wrung sharply at the edges of the diaphragm surfaces so that over the whole width of the latter the wires stand edgewise.

In Figures 5 and 6 is used a metal tape 25 having a low rectangular cross-section, which opposite to the diaphragm surfaces is pressed up to a corrugated cross-section. The pressed-up cross-section may alternatively be angular or U-shaped or of other suitable shape. The pressing operation may be performed more or less gradually whereby it may be obtained that the low cross-section from the edges of the diaphragm surfaces gradually rises to a pronounced profiled cross-section.

Other embodiments with varying cross-section may for instance be produced by locally flattening or rolling a profile produced beforehand and being e. g. U-shaped, V-shaped or hollow.

Figure 7:
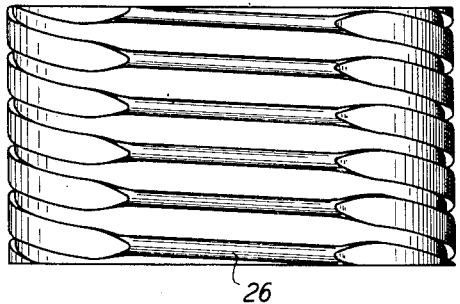

In the case of Figure 7 round wires 26 are used, which are flattened, for instance by rolling, at the strongly curved parts of the sheath at the sides of the cable. At the diaphragm surfaces the wires have their original round cross-section.

Figure 8:
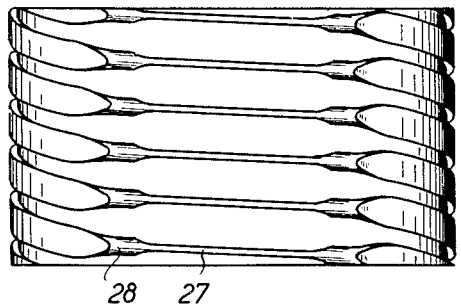

The rolling may also be carried out crosswise as shown in Figure 8 so that the round wires 27 become alternately compressed and flattened. In this case the arrangement is such that the profile is placed edgewise opposite the diaphragm surfaces and lies down opposite the strongly curved parts of the sheath while the wires have their normal profile at the transition places 28.

After having applied the wires to the cable the latter is asphalted and then provided with a tarred or asphalted jute covering 24, see Figures 1 and 2, or another protection or armouring.

Although the invention is preferably used in connection with flat cables as shown on the drawings it may, however, also be employed in connection with cables in which the axes of the individual conductors are not in alignment, but for instance arranged at the vertices of a triangle or another polygon. The invention may also be used in connection with single-core-cables with oval or less flattened cross-section form than that shown on the drawings. Moreover, at any rate some of the advantages of the invention will be present, when the cable has a single diaphragm surface, only, which may either run longitudinally or follow a helical line having a large pitch.

Having thus fully described our invention we claim as new and desire to secure by Letters Patent:

1. An electric power cable comprising an insulated conductor construction, a sheath surrounding said conductor construction and consisting of impermeable material and the cross-section of which circumferentially is composed of at least one strongly curved part and at least one less curved substantially flat part providing a diaphragm member, and an outer resilient winding which supports said diaphragm member in such manner that the latter member may yield elastically according to differences in the pressure at the inner side of the sheath, said winding comprising at least one winding member having varying rigidity along the circumference of the sheath, the rigidity being greatest at the diaphragm member.

2. The electric power cable of claim 1, in which the winding member longitudinally has heat-treated sections separated by non heat-treated sections.

3. The electric power cable of claim 1, in which the winding member longitudinally has mechanically-treated sections separated by non mechanically-treated sections.

4. The electric power cable of claim 1, in which the winding member has hardened sections at definite intervals along the length of said member.

5. The electric power cable of claim 1, in which the winding member has annealed sections at definite intervals along the length of said member.

6. The electric power cable of claim 1, in which the winding member has hardened sections at definite intervals along its length separated by annealed sections.

7. An electric power cable comprising an insulated conductor construction, a sheath surrounding said conductor construction and consisting of impermeable material and the cross-section of which circumferentially is composed of at least one strongly curved part and at least one less curved substantially flat part providing a diaphragm member, and an outer resilient winding which supports said diaphragm member in such a manner that the latter member may yield elastically according to differences in the pressure at the inner side of the sheath, said winding comprising at least two winding members arranged side by side, each winding member having varying rigidity along the circumference of the sheath, the rigidity being greatest at the diaphragm member.

8. An electric power cable comprising an insulated conductor construction, a sheath surrounding said conductor construction and consisting of impermeable material and the cross-section of which circumferentially is composed of at least one strongly curved part and at least one less curved substantially flat part providing a diaphragm member, and an outer resilient winding which supports said diaphragm member in such a manner that the latter member may yield elastically according to differences in the pressure at the inner side of the sheath, said winding comprising at least two superposed winding members with opposite winding direction, each winding member having varying rigidity along the circumference of the sheath, the rigidity being greatest at the diaphragm member.

9. An electric power cable comprising an insulated conductor construction, a sheath surrounding said conductor construction and consisting of impermeable material and the cross-section of which circumferentially is composed of at least one strongly curved part and at least one less curved substantially flat part providing a diaphragm member, and an outer resilient winding which supports said diaphragm member in such a manner that the latter member may yield elastically according to differences in the pressure at the inner side of the sheath, said winding comprising at least two winding members lying over each other, each winding member having varying rigidity along the circumference of the sheath, the rigidity being greatest at the diaphragm member.

10. The electric power cable of claim 9, in which said winding members have opposite winding directions.

11. The electric power cable of claim 1, in which said winding member has a constant cross-section, the position of which relatively to the sheath is varying along the circumference of the sheath.

12. An electric power cable comprising an insulated conductor construction, a sheath surrounding said conductor construction and consisting of impermeable material and the cross-section of which circumferentially is composed of strongly curved parts and intermediate less curved substantially flat parts providing a diaphragm member, and an outer resilient winding which supports said diaphragm member in such a manner that the latter member may yield elastically according to differences in the pressure at the inner side of the sheath, said winding comprising at least one winding member, the cross-section of which has different resisting moment in two directions perpendicular to each other, said winding member being twined about its own axis so that a higher profile occurs at the diaphragm member.

13. An electric power cable comprising an insulated conductor construction, a sheath surrounding said conductor construction and consisting of impermeable material and the cross-section of which circumferentially comprises a strongly curved arcuate part and a less curved substantially flat part providing a diaphragm member, and an outer resilient winding which supports said diaphragm member in such a manner that the latter member may yield elastically according to differences in the pressure at the inner side of the sheath, said winding comprising at least two winding members lying side by side, the cross-section of which has different resisting moment in two directions perpendicular to each other, said winding members being twined about their own axis with different pitch, respectively, at the diaphragm member.

14. An electric power cable comprising in combination an insulated conductor construction, a sheath surrounding said conductor construction and consisting of impermeable material and the cross-section of which circumferentially is composed of at least one strongly curved part and at least one less curved substantially flat part providing a diaphragm member, and an outer resilient winding which supports said diaphragm member in such manner that the latter member may yield elastically according to differences in the pressure at the inner side of the sheath, said winding comprising at least one winding member consisting of a strip with a flat cross-section pressed up to a profiled cross-section at the diaphragm member.

15. An electric power cable comprising in combination an insulated conductor construction, a sheath surrounding said conductor construction and consisting of impermeable material and the cross-section of which circumferentially is composed of at least one strongly curved part and at least one less curved substantially flat part providing a diaphragm member, and a resilient winding which externally supports said diaphragm member in such manner that the latter member may yield elastically according to differences in the pressure at the inner side of the sheath, said winding comprising at least one wire flattened at the strongly curved part of the sheath.

16. An electric power cable comprising an insulated conductor construction, a sheath surrounding said conductor construction and consisting of impermeable material and the cross-section of which circumferentially is composed of at least one strongly curved part and at least one less curved substantially flat part providing a diaphragm member, and a resilient winding which externally supports said diaphragm member in such manner that the latter member may yield elastically according to differences in the pressure at the inner side of the sheath, said winding comprising at least one wire flattened in directions perpendicular to each other at the strongly curved part of the sheath and the less curved part of the sheath, respectively.

JOHANNES SØRENSEN MØLLERHØJ.
SVEND STIGSGAARD.

REFERENCES CITED

The following references are of record in the file of this patent:

UNITED STATES PATENTS

| Number | Name | Date |
|---|---|---|
| 2,290,698 | Mollerhoj | July 21, 1942 |